US012533775B2

(12) United States Patent
Pistor

(10) Patent No.: US 12,533,775 B2
(45) Date of Patent: Jan. 27, 2026

(54) SCREWDRIVER INSERT

(71) Applicant: Wera Werkzeuge GmbH, Wuppertal (DE)

(72) Inventor: Oliver Pistor, Wuppertal (DE)

( * ) Notice: Subject to any disclaimer, the term of this patent is extended or adjusted under 35 U.S.C. 154(b) by 349 days.

(21) Appl. No.: 18/034,103

(22) PCT Filed: Oct. 26, 2021

(86) PCT No.: PCT/EP2021/079598
§ 371 (c)(1),
(2) Date: Apr. 27, 2023

(87) PCT Pub. No.: WO2022/090183
PCT Pub. Date: May 5, 2022

(65) Prior Publication Data

US 2023/0381931 A1 Nov. 30, 2023

(30) Foreign Application Priority Data

Oct. 28, 2020 (DE) ..................... 10 2020 128 348.2
Feb. 9, 2021 (DE) ..................... 10 2021 102 937.6

(51) Int. Cl.
*B25B 13/10* (2006.01)
*B25F 1/04* (2006.01)

(52) U.S. Cl.
CPC .............. *B25B 13/102* (2013.01); *B25F 1/04* (2013.01)

(58) Field of Classification Search
CPC ......... B25B 13/00; B25B 13/02; B25B 13/06; B25B 13/10; B25B 13/102; B25B 15/001;
(Continued)

(56) References Cited

U.S. PATENT DOCUMENTS 2,735,325 A * 2/1956 Rudd .................... B25B 15/008 81/439
3,127,798 A * 4/1964 Gol ....................... B25B 15/008 81/439
(Continued)

FOREIGN PATENT DOCUMENTS

DE 197 38 079 A1 3/1999
DE 10 2007 041 574 A1 3/2009
(Continued)

OTHER PUBLICATIONS

International Search Report in PCT/EP2021/079598, mailed Jan. 31, 2022.

*Primary Examiner* — Robert J Scruggs
(74) *Attorney, Agent, or Firm* — Collard & Roe, P.C.

(57) ABSTRACT

A screwing tool includes an elongate shaft which has, at each of its two ends, an output profile for insertion into a screwing tool insertion opening of a screw, and comprising a first insert and a second insert, which inserts: are each axially slidably arranged for conjoint rotation in a first and second cavity which are open toward an end face of the output profiles; each form, by means of their ends protruding from the cavity, an output profile; when in a position protruding from the cavity, are each supported, by means of a stop, on a counter-stop of the shaft; and can, by applying an axial force, be moved into the respective cavity against the restoring force of a spring element arranged in a chamber extending between the first cavity and the second cavity.

12 Claims, 9 Drawing Sheets

(58) Field of Classification Search

CPC ....... B25B 15/008; B25B 15/02; B25B 15/04; B25B 15/06; B25B 23/007; B25B 23/0035; B25B 23/0042; B25B 23/142; B25B 27/02; B25B 27/14; B25F 1/02; B25F 1/04

See application file for complete search history.

(56) References Cited

U.S. PATENT DOCUMENTS

| | | | | | |
|---|---|---|---|---|---|
| 3,651,720 | A | * | 3/1972 | Indyk | B25B 13/06 81/185 |
| 5,343,786 | A | * | 9/1994 | Wridt | B25B 23/0035 81/439 |
| 6,263,771 | B1 | | 7/2001 | Strauch | |
| 9,308,629 | B2 | * | 4/2016 | Gadd | B25B 13/102 |
| 2019/0111548 | A1 | | 4/2019 | Chu | |

FOREIGN PATENT DOCUMENTS

| | | | | |
|---|---|---|---|---|
| DE | 10 2012 103 678 | B4 | | 10/2019 |
| FR | 2 176 267 | A5 | | 10/1973 |
| FR | 2176267 | | * | 10/1973 |
| GB | 2329859 | A | | 4/1999 |
| GB | 2 390 317 | A | | 1/2004 |

* cited by examiner

Fig:1
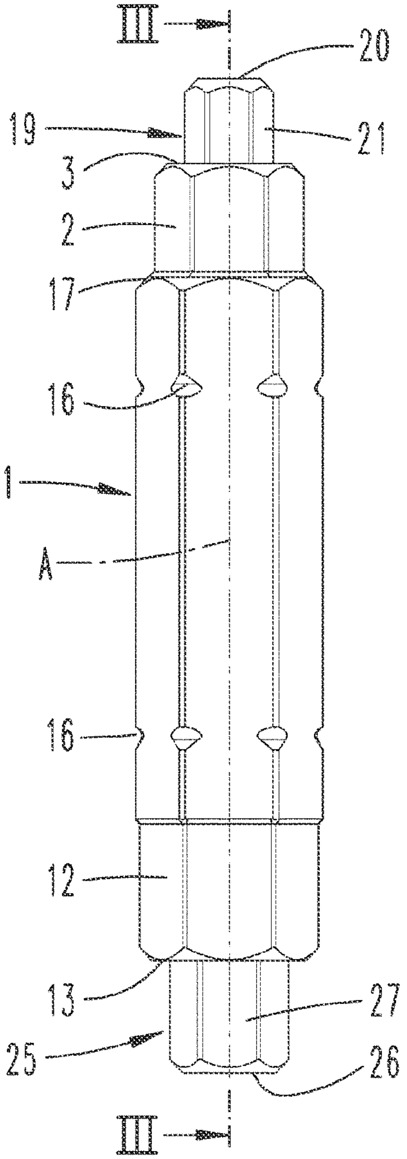
Fig:3
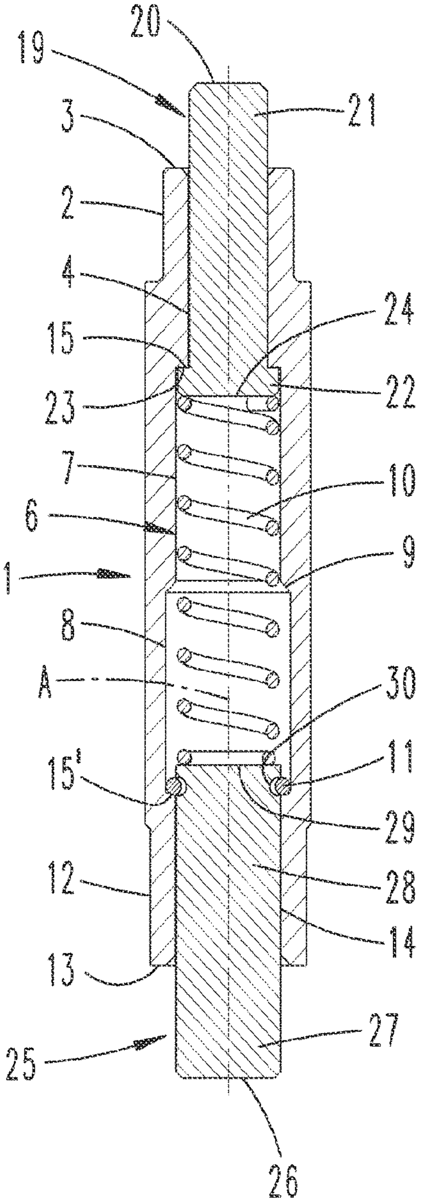
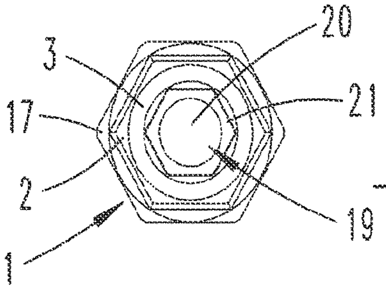
Fig:2

SCREWDRIVER INSERT

CROSS REFERENCE TO RELATED APPLICATIONS

This application is the National Stage of PCT/EP2021/079598 filed on Oct. 26, 2021, which claims priority under 35 U.S.C. § 119 of German Application No. 10 2020 128 348.2 filed on Oct. 28, 2020 and German Application No. 10 2021 102 937.6 filed on Feb. 9, 2021, the disclosures of each of which are incorporated by reference. The international application under PCT article 21(2) was not published in English.

TECHNICAL FIELD

The invention relates to a screwing tool with an elongate shaft, which extends in the direction of an axis and has at least on one of its two ends a first output profile for insertion into a screwing tool insertion opening of a screw.

PRIOR ART

Screwdriver inserts are known, for example, from DE 10 2012 103 678 B4. A screwdriver insert has an insertion shaft that can be inserted into a polygonal opening of a bit holder. The insertion shaft may have a hexagonal cross section. The end of the screwdriver insert lying opposite of the insertion shaft forms an output profile for insertion into a screwing tool insertion opening of a screw.

DE 10 2007 041 574 A1 discloses a screwing tool, which respectively has output profiles on its ends that point away from one another. The output profiles have different sizes. DE 197 38 079 A1 describes an essentially hexagonal output profile.

A generic screwing tool is described in GB 2390317 A. A shaft has a polygonal profile and a cavity on both of its free ends. An insert with another polygonal profile is respectively seated in the cavity. The two inserts are acted upon by a spring element in such a way that they can be displaced into the cavity. The inserts are supported with stops on counter stops of the shaft in the position, in which they protrude out of the cavity.

GB 2329859 A describes a screwing tool, in which an insert is seated in a cavity, wherein said insert is supported with a head on a step of the cavity and acted upon by a spring element.

SUMMARY OF THE INVENTION

The invention is based on the objective of advantageously enhancing a screwing tool of the generic type with respect to its use.

This objective is attained with the invention specified in the claims, wherein the dependent claims not only represent advantageous enhancements of the invention specified in the coordinate claims, but rather also independent solutions to the objective. The characteristics of the dependent claims can be arbitrarily combined with one another in order to realize exemplary embodiments of the invention.

It is initially and essentially proposed that the screwing tool has an elongate shaft. The elongate shaft has an output profile on one end. An end face is located in the region of the output profile. An opening of a cavity is located in the end face. An insert that is displaceable in the direction of the axis of the shaft of the screwing tool is seated in the cavity in a rotationally fixed manner relative to the shaft. The insert can be displaced against the restoring force of a spring element. The insert protrudes out of the cavity with one end. This end forms a second output profile. It is particularly proposed that the second output profile is similar to the first output profile. If the first output profile has a hexagonal cross section or a modified-hexagonal cross section of the type described in DE 197 38 079 A1, for example, the cross section of the second output profile has according to a variation of the invention a similar cross section. The second output profile essentially differs from the first output profile by a smaller width. However, the first output profile and the second output profile may according to a variation also be designed dissimilar, wherein it is proposed, for example, that the second output profile is a cross slot profile or a slot profile or even a circumferential wave profile of the type described in DE 197 38 079 A1. The first output profile may also be such a wave profile. According to an enhancement of the invention, it is proposed that the spring element extends in a chamber that adjoins the cavity. The spring element may be a prestressed pressure spring, particularly a helical pressure spring. One end of the spring element is supported on an end face of the insert. This concerns an end face that lies opposite of the output profile of the insert. It would be possible that the insert can be completely pushed into the cavity against the restoring force of the spring element until an end face of the insert lies in the plane of the end face of the first output profile. The end of the insert lying opposite of the second output profile may form a head that protrudes radially referred to the axis. If a characteristic distance such as the edge length of the polygonal profile of the second output profile or the distance between two surfaces of the polygonal profile that face away from one another is assigned to the shaft seated in the cavity, the head has a greater characteristic distance than this characteristic distance. The radially protruding stop interacts with a step of the cavity or the chambers, by means of which the insert is prevented from being pushed out of the cavity by the pressure spring. The prestressed pressure spring therefore can hold the insert in a stop-limited position, in which the second output profile protrudes out of the cavity. The second output profile can be used for turning a screw with a screwing tool insertion opening that is adapted to this second output profile. The first output profile can be used for turning a screw with a larger screwing tool insertion opening. The screwing tool is inserted into this larger screwing tool insertion opening. In the process, the insert protruding from the cavity contacts the base of the screwing tool insertion opening with its end face. The insert yields into the cavity by exerting an axial pressure such that the first output profile, which is larger than the second output profile, can be inserted into the screwing tool insertion opening. The tool can be pulled out of the screwing tool insertion opening again after the screw has been turned. In the process, the relaxing pressure spring once again displaces the insert back into the stop position.

The shaft may have a third output profile on its second end. The third output profile may be realized uniformly in material with the shaft just like the first output profile. The third output profile likewise has an end face with an opening of a cavity. A second insert is seated in this second cavity and likewise can be displaced against the restoring force of a spring. This may concern the same spring that also acts upon the insert with the second output profile. The third output profile may have a size that is slightly larger or slightly smaller than the size of the first output profile. However, the size of the third output profile preferably is larger than the size of the second output profile. The fourth output profile once again differs from the second output profile and may be larger or smaller than the second output profile.

The inventive screwing tool has a shaft that may have output profiles of different sizes on its two ends. The shaft may have a larger diameter between the two output profiles. The shaft may have a polygonal cross section in the region between the output profiles, wherein the polygonal profile may, for example, have a greater edge length than the polygonal profile of the two output profiles. The screwing tool may be a screwdriver insert. The screwdriver insert can be inserted into a driving tool, e.g. into a polygonal receptacle opening of a ratchet handle or ratchet mechanism, with the profiled shaft. The shaft has a central bore, which is produced by means of broaching or the like and extends from one end face to the other end face in the direction of the axis of the shaft. The central bore is open toward both sides. The two ends of the central bore form the aforementioned cavities, in which inserts with output profiles of different sizes are respectively seated. The insert seated in a first cavity forms the second output profile, which is smaller than the third output profile formed by the second insert seated in a second cavity, wherein the cross-sectional area of the second cavity is greater than the cross-sectional area of the first cavity. The head of the first insert may have a cross section that is larger than the cross section of the second output profile and approximately corresponds to the cross section of the second cavity such that the first insert can be inserted into the central bore through the second cavity. After the insertion of the first insert, the spring element is inserted into the central bore such that it lies in the chamber adjoining the cavity. The second insert ultimately is inserted into the second cavity. This second insert has a circumferential groove on its end lying opposite of the output profile. A stop element that can be elastically deformed radially inward in a C-shaped manner, e.g. a C-shaped spring element, lies in this circumferential groove. The stop element can be deformed to such a degree that the second insert can be pushed into the second cavity. The chamber adjoining the second cavity has a larger cross section such that a step is formed. When the compressed stop element reaches the chamber, it can expand radially outward and support itself on the step. The second insert can be pushed into the assigned cavity in the same manner as described above with reference to the first insert until the end face of the insert is flush with the end face of the end face of the shaft containing the cavity. The pressure spring may also be designed in such a way that both inserts can be completely pushed into their assigned cavities simultaneously such that the end face of the first output profile lies in one plane with the end face of the second output profile and the end face of the third output profile at the same time lies in one plane with the end face of the fourth output profile. It would be possible that both inserts respectively have circumferential grooves, in which an elastically deformable stop element such as a C-shaped spring element lies.

The invention not only includes exemplary embodiments of a screwing tool that forms a screwdriver insert. The shaft may also be formed by a handle or an offset screwdriver. Furthermore, the shaft may also have a handle or be seated in a handle, respectively. The shaft may be formed by a tang that is seated in a plastic handle or a wood handle. The shaft may on its free end form a blind bore, in which an insert supported on a base of the blind bore by a pressure spring is seated. The insert can be completely displaced into the blind bore against the restoring force of a spring element, preferably a pressure spring, in the above-described manner. An offset screwdriver may have a respective blind bore, in which an insert that preferably can be completely displaced into the blind bore is seated in the above-described manner, on the end of its short limb and on the end of his long limb. The handle may be realized in the form of a socket. The handle may have a cavity, in which a shaft that merely carries a chamber that is open toward the end face is seated, wherein an insert, which is supported on a pressure spring supported on a support element, is located in said chamber. The support element may be a support plate that is supported on a step of the cavity of the handle. The insert may have a through-bore and be supported on the support plate. The handle may have a polygonal opening, e.g. a hexagonal or square opening, for inserting a driving profile on the side lying opposite of the insert. The driving profile can be turned by a driving device such as an electric screwdriver.

BRIEF DESCRIPTION OF THE DRAWINGS

Exemplary embodiments of the invention are described in greater detail below with reference to the attached drawings. In these drawings:

FIG. 1 shows a view of a screwdriver insert according to a first exemplary embodiment, FIG. 2 shows an end face view of the screwdriver insert, FIG. 3 shows the section along the line III-III.

DESCRIPTION OF THE EMBODIMENTS

Figure 4:
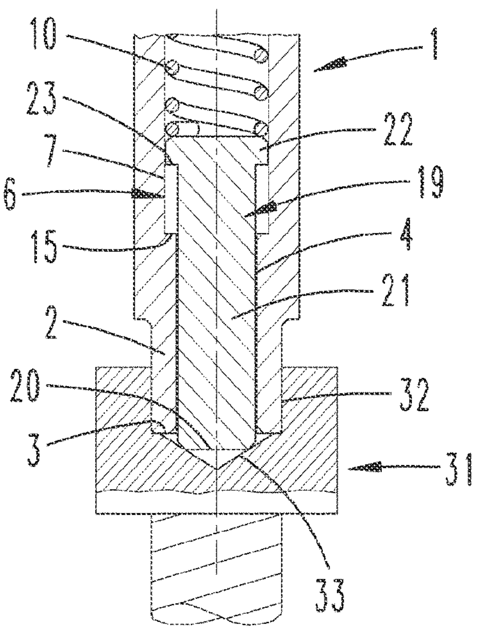
FIG. 4 shows a first application, in which a first output profile 2 is inserted into a screwing tool insertion opening 32 of a screw 31.

The screwdriver insert has a shaft 1 that has a length of approximately 25-30 mm. A central section of the shaft 1 has a hexagonal cross-sectional profile with corner recesses 16 on the polygon corners of the profile. The shaft can be temporarily fixed in an insertion opening of a not-shown driving tool with the aid of these corner recesses 16 in order to be turned with the driving tool. The driving tool may be a screwing tool, particularly a ratchet mechanism or a ratchet handle.

A first end of the shaft 1 forms a first output profile 2 with a hexagonal cross section. The first output profile 2 has an end face 3 with an opening of a cavity 4.

The second end of the shaft 1 forms a third output profile 12 that likewise has a hexagonal profile, but with a slightly larger edge length. The end face 13 of the third output profile 12 has an opening of a cavity 14.

The two cavities 4, 14 form a central bore, which extends along an axis A of the shaft 1, together with a chamber 6 consisting of the chamber sections 7 and 8. The cross-sectional areas of the cavities 4 and 14 are hexagonal whereas the cross sections of the chamber sections 7, 8 may be round or likewise designed polygonally. The chamber 6 forms a chamber section 7 that has a first cross section and transforms into the second chamber section 8, which has a larger cross section, such that a step 9 is formed.

A first insert 19 is seated in the cavity 4 and forms a second output profile 21, which in the exemplary embodiment is a hexagonal profile, with a section protruding out of the cavity 4. The insert 19 has a constant hexagonal cross section from its end face 20 up to a head 22. The cross section of the head 22 is larger than the cross section of the cavity 4 such that the head 22 forms radially protruding stop surfaces 23 that are supported on a step 15, on which the chamber section 7 transforms into the cavity 4. The insert 19 therefore is seated in the cavity 4 in a stop-limited and rotationally fixed manner.

The cavity 14 has an internal cross section that is slightly larger than the cross section of the head 22 such that the insert 19 can be inserted through the cavity 14.

A pressure spring 10, particularly a helical pressure spring 10, is provided and supported on an end face 24 of the insert 19 with one of its two ends.

A second insert 25, which forms a shaft 28 extending over the entire length of the insert 25, has over its entire length a hexagonal cross section that is slightly smaller than the hexagonal cross section of the cavity 14. Its end protruding out of the cavity 14 forms a fourth output profile 27 that is larger than the second output profile 21, but smaller than the first output profile 2.

The end of the insert 25 protruding as far as into the chamber section 8 has a circumferential groove 30. The circumferential groove 30 has such a depth that a springable clamping ring 11 can be accommodated in the circumferential groove 30. The insert 25 can be inserted into the cavity 14 with its end face 29 first when the clamping ring 11 is compressed in the radial direction. The second end of the spring element 10 is then supported on the end face 29. When the clamping ring 11 overruns the step 15', it can yield in the radial direction in order to support itself on a second step 15' so as to prevent the insert 25, which is arranged in a rotationally fixed manner relative to the shaft, from moving out of the cavity 14.

The pressure spring 10 that is compressed during the installation holds the two inserts 19, 25 in the stop-limited protruding position, which is illustrated in FIG. 3 and in which the second output profile 21 and the fourth output profile 27 protrude beyond the respective end faces 3, 13 of the shaft 1. The respective insert 19, 25 can be displaced in the axial direction to such a degree that its respective end face 20 or 26 is aligned with the end face 3, 13 of the shaft 1 by exerting an axial pressure either upon the end face 20 of the insert 19 or upon the end face 26 of the insert 25.

The screwing tool functions as follows:

In order to turn a screw 31 with the first output profile 2, the second output profile 21 needs to be inserted into the screwing tool insertion opening 32 of the screw 31. Since the screwing tool insertion opening 32 corresponds to the size of the first output profile 2 and the end face 20 of the second output profile 21 is supported on the base 33 of the screwing tool insertion opening 32, the insert 19 is displaced into the cavity 4 when an axial force is exerted upon the shaft 1 such that the first output profile 2 can be inserted into the screwing tool insertion opening 32 according to FIG. 4. The stop surface 23 of the head 22 has in the process moved away from the step 15. The pressure spring 10 once again presses the insert 19 into the starting position illustrated in FIG. 3 once the first output profile 2 is pulled out of the screwing tool insertion opening 32.

Figure 5:
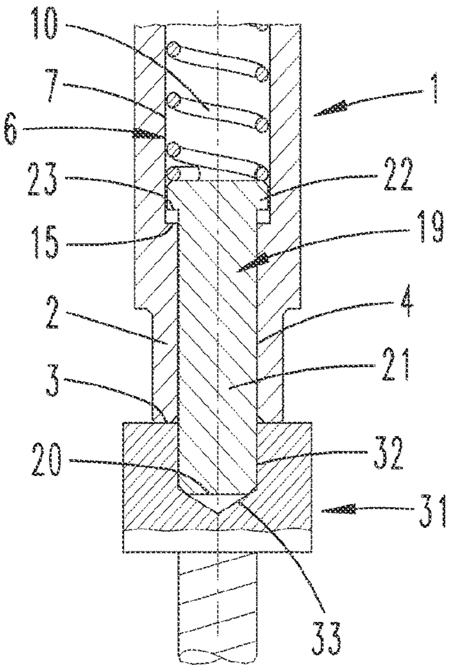
FIG. 5 shows a second application, in which a second output profile 21 is inserted into a screwing tool insertion opening 32 of a screw 31.

FIG. 5 shows the use of the second output profile 21 in a screwing tool insertion opening 23 with a cross section that corresponds to the second output profile 21. The end face 20 likewise is supported on the base 33 when the second output profile 21 is inserted into the screwing tool insertion opening 32. However, the end face 3 of the first output profile 2 is supported on the end face of the screw head in this case. The stop surface 23 may slightly move away from the step 15.

Figure 6:
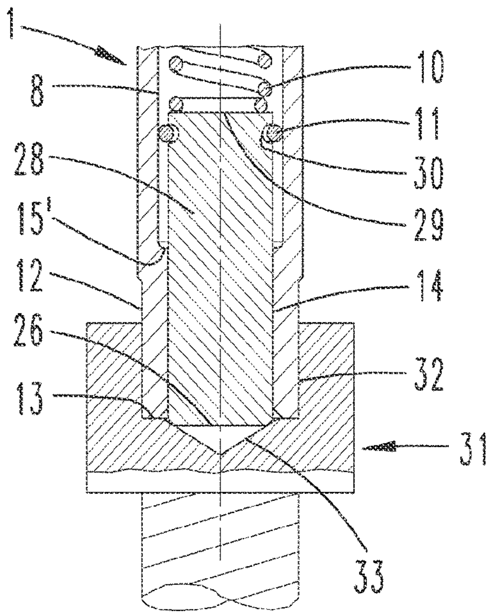
FIG. 6 shows a third application, in which a third output profile 12 is inserted into a screwing tool insertion opening 32 of a screw 31.

FIG. 6 shows an application analogous to FIG. 4, wherein the screwing tool insertion opening of the screw 31 has a cross section that corresponds to the cross section of the third output profile 12. The end face 26 of the insert 25 is supported on the base 33 of the screwing tool insertion opening 32 in this case when the third output profile 12 is inserted into the screwing tool insertion opening 32. The insert 25 migrates into the cavity 14, wherein the clamping ring 11 moves away from the step 15.

Figure 7:
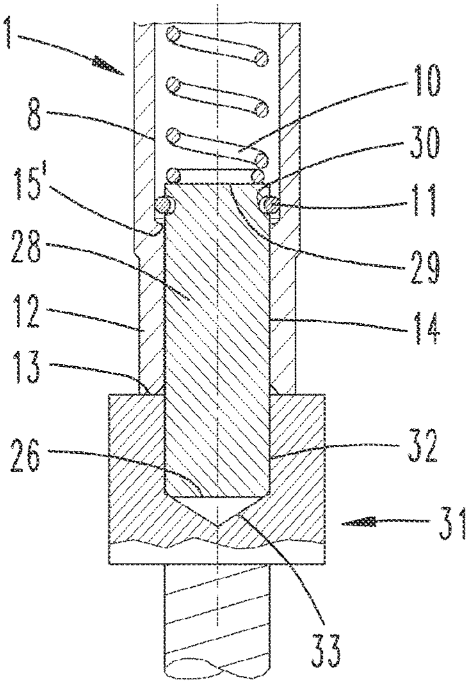
FIG. 7 shows a fourth application, in which a fourth output profile 27 is inserted into a screwing tool insertion opening 32 of a screw 31.
Figure 8:
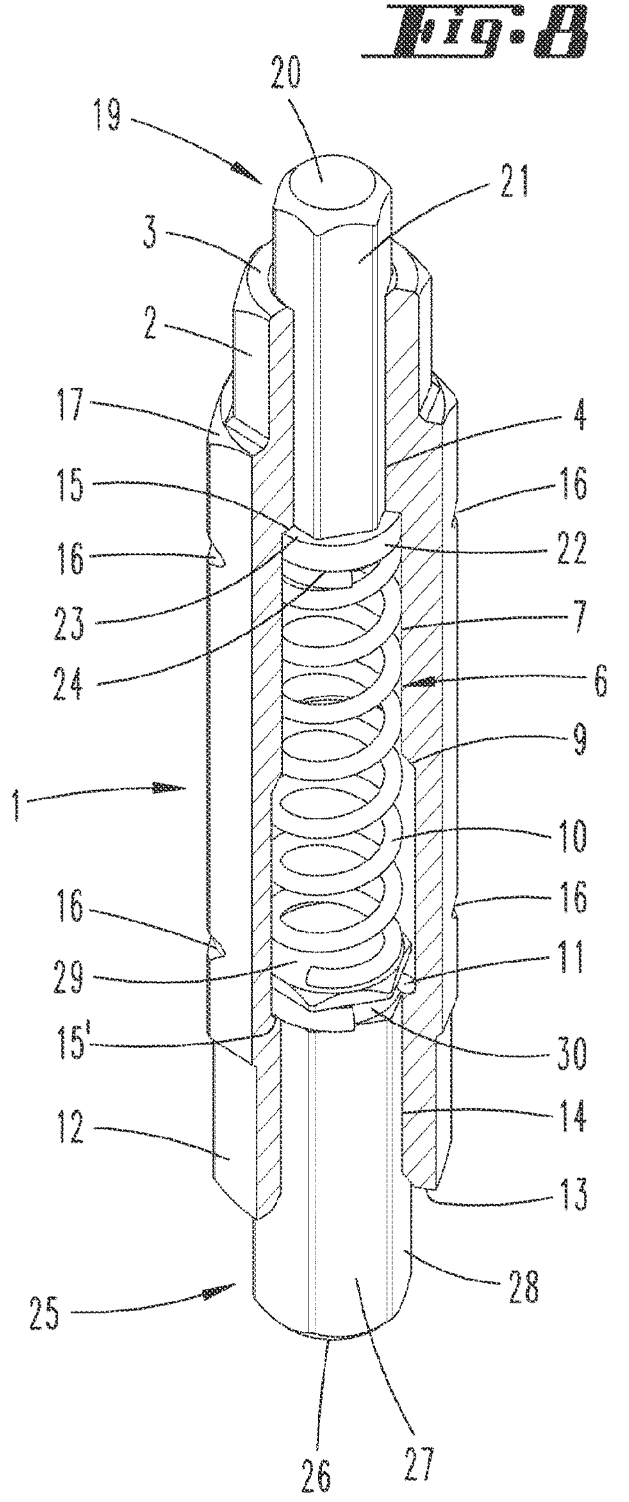
FIG. 8 shows a partially opened perspective representation of the first exemplary embodiment.

FIG. 7 shows an application analogous to FIG. 5. In this case, the cross section of the screwing tool insertion opening 32 corresponds to the cross section of the fourth output profile 27. The end face 13 of the third output profile 12 can be supported on the end face of the screw head of the screw 31 when the fourth output profile 27 is inserted into the screwing tool insertion opening 32.

The shaft can be rotationally driven in order to turn the screw 31 in any of the operating positions illustrated in FIGS. 4-7. To this end, a corresponding screwing tool engages on the polygon surfaces of the central region of the shaft 1. The polygon surfaces of the inserts 19, 25 flatly abut on polygon surfaces of the cavities 4, 14 such that the inserts 19, 25 are assigned to the shaft 1 in an axially displaceable, but rotationally fixed manner. The screwing tool with an overall length of approximately 35 mm therefore is able to actuate screws with screwing tool insertion openings of four different sizes.

Figure 9:
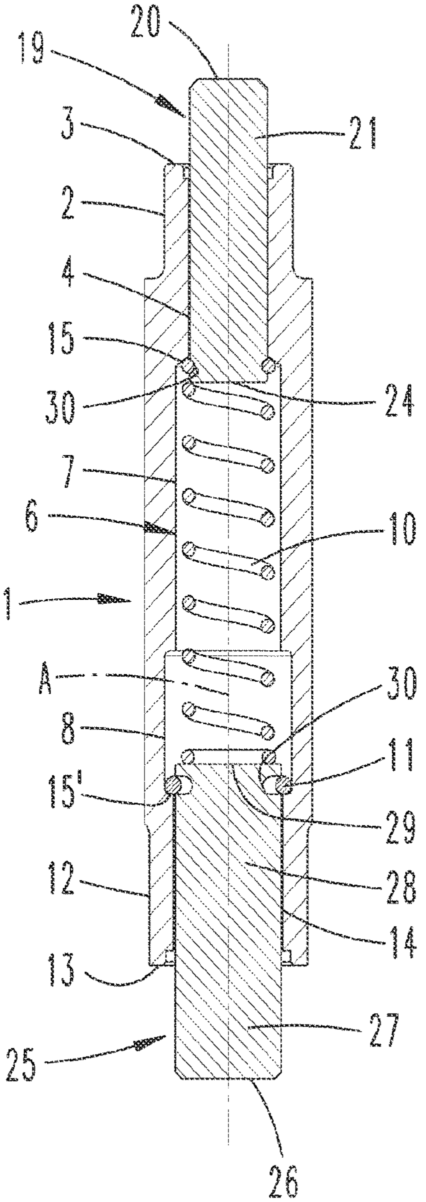
FIG. 9 shows a second exemplary embodiment in the form of a representation according to FIG. 3.

FIG. 9 shows a second exemplary embodiment that essentially only differs from the first exemplary embodiment in that the insert 19 also has a circumferential groove 30, in which a spring ring is arranged, on its end that points away from the output profile 21. The invention therefore also includes screwdriver inserts, in which both inserts 19, 25 respectively have circumferential grooves 30 with C-shaped spring rings arranged therein on their ends that lie opposite of the output profiles 21, 27.

Figure 10:
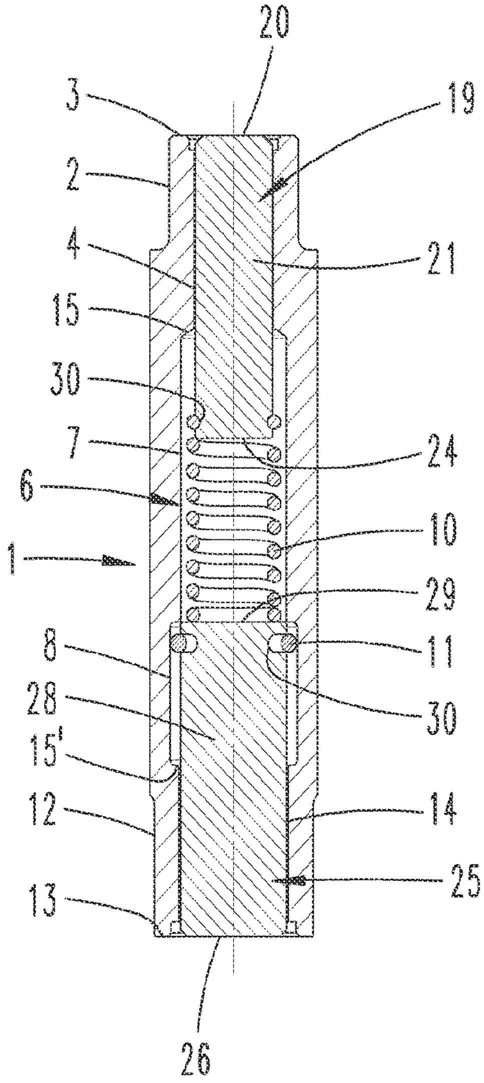
FIG. 10 shows a representation according to FIG. 9, in which both inserts 19, 25 are completely pushed into their assigned cavities 4, 14 simultaneously.

FIG. 10 shows a situation, in which both inserts 19, 25 are completely pushed into their assigned cavities 4, 14 such that the end face 20 is aligned with the end face 3 and the end face 26 is aligned with the end face 13. This position particularly can be reached when the screwdriver insert is inserted into a standard bit holder that has a blind bore, into which the shaft 1 can be inserted, as well as retaining elements such as latching balls that engage into corner recesses 16. The respective end face 20 or 26 is then supported on the base of the blind bore.

Figure 11:
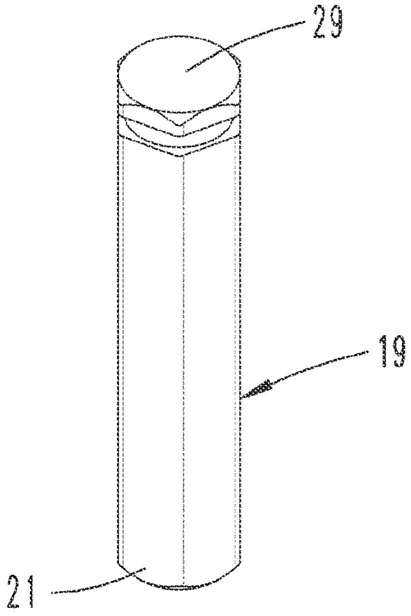
FIG. 11 shows a first variation of an insert 19 in the form of a polygonal output profile 21.

FIG. 11 shows a perspective representation of an insert 19 with a polygonal cross section. However, this may also concern an output profile 21 in the form of a square cross section.

Figure 12:
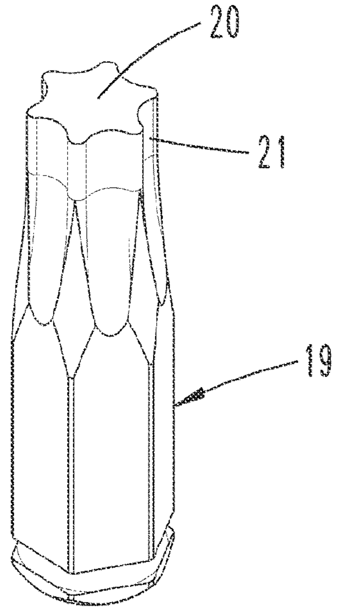
FIG. 12 shows a second variation of an insert 19 with an output profile 21 in the form of a circumferential wave profile.

FIG. 12 shows a perspective representation of an insert 19 with an output profile 21 in the form of a circumferential wave profile that is also known as a Torx profile.

Figure 13:
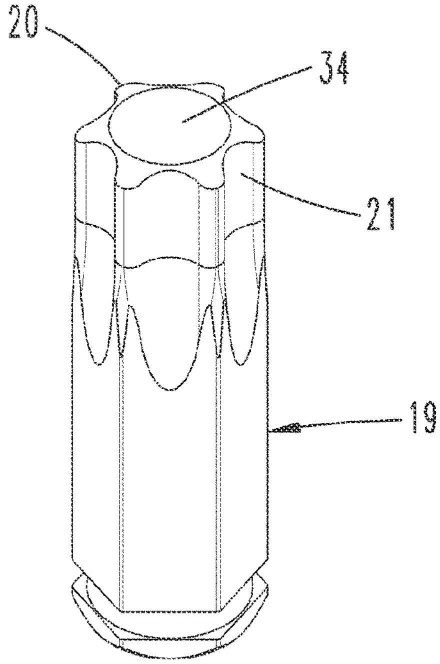
FIG. 13 shows a third variation of an insert 19, which likewise has an output profile 21 in the form of a circumferential wave profile, but with an opening 34 arranged in the end face 20.

FIG. 13 shows a modification of the insert 19 illustrated in FIG. 12. The output profile 21 also has a Torx profile in this case. However, the end face 20 has an opening 34.

Figure 14:
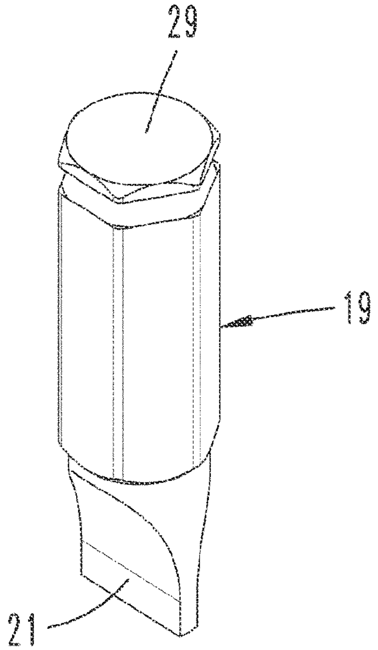
FIG. 14 shows a fourth variation of an insert 19 with an output profile 21 in the form of an oblong rectangle for engaging into the slot of a slotted screw.

FIG. 14 shows a perspective representation of an insert 19 with an output profile 21 for insertion into a slot of a slotted screw.

Other exemplary embodiments, which are not illustrated in the figures, have output profiles 21 that are designed differently from those in FIGS. 11-14, e.g. a cross slot profile or a triangular profile. The rear section of the inserts seated in the cavity of the shaft is profiled in the shape of a polygon.

Figure 16:
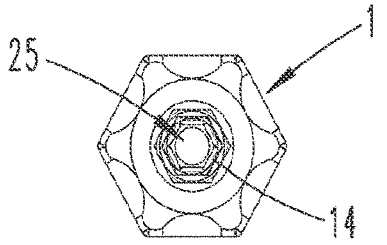
FIG. 16 shows the fifth exemplary embodiment in the form of a representation according to FIG. 2.
Figure 15:
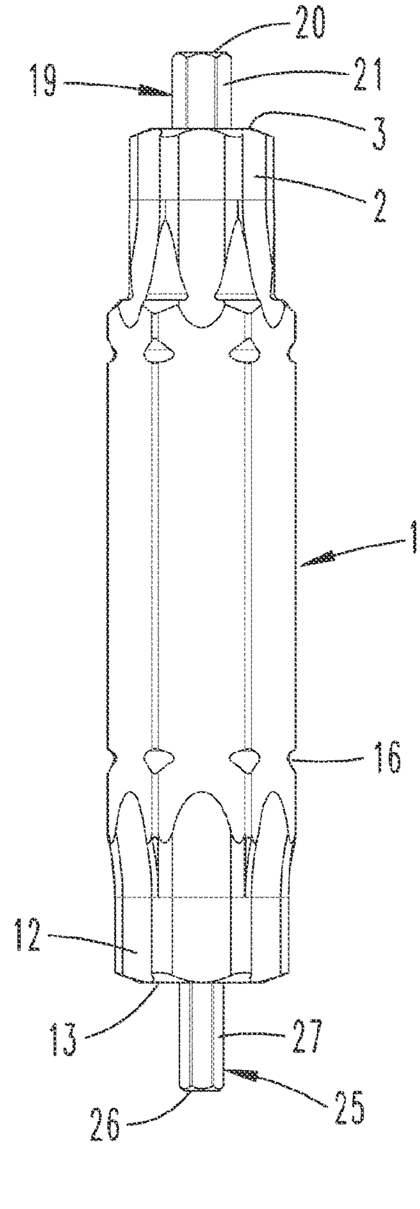
FIG. 15 shows a fifth exemplary embodiment in the form of a representation according to FIG. 1.

FIGS. 15 and 16 show a fifth exemplary embodiment, in which the output profiles 2 and 12 are Torx profiles with different widths. The output profiles 21 and 27 have a hexagonal profile.

Figure 17:
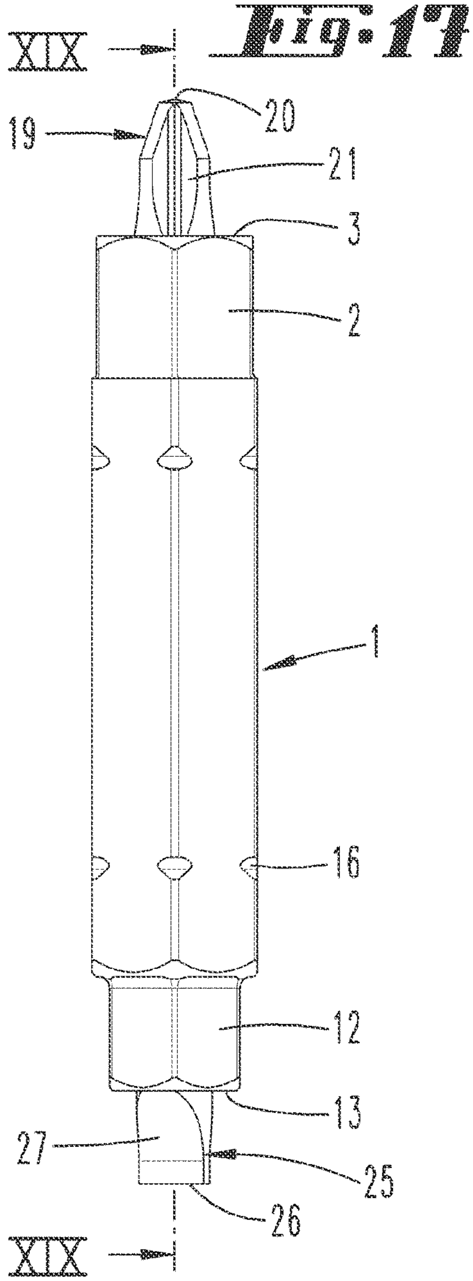
FIG. 17 shows a sixth exemplary embodiment in the form of a representation according to FIG. 1.
Figure 18:
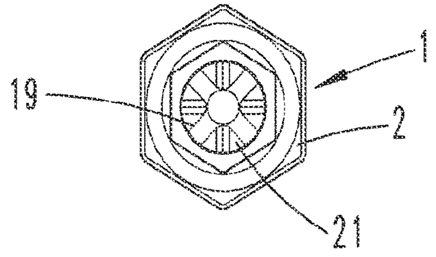
FIG. 18 shows the sixth exemplary embodiment in the form of a representation according to FIG. 2.
Figure 19:
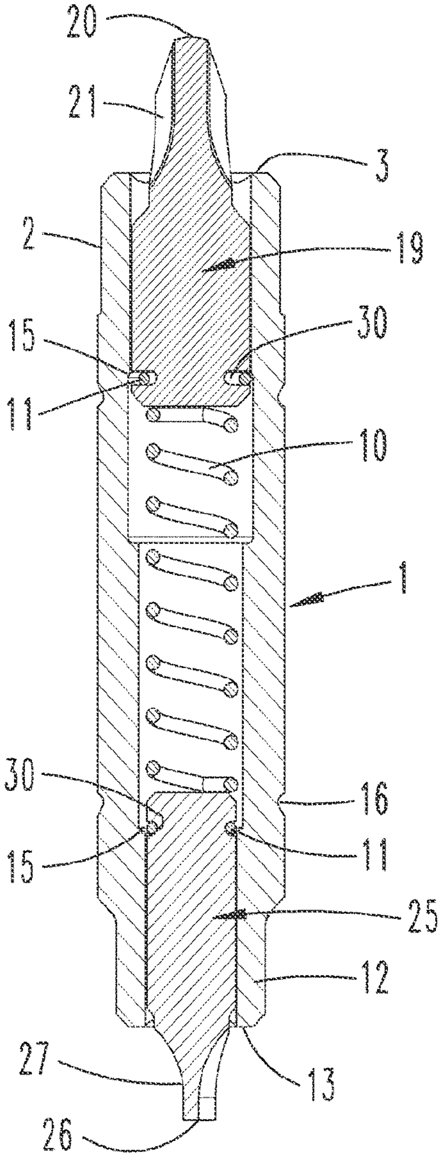
FIG. 19 shows the sixth exemplary embodiment in the form of a representation according to FIG. 3.

FIGS. 17-19 show a sixth exemplary embodiment, in which the first and second output profiles 2, 12 are hexagonal profiles. In contrast, the output profiles 21 and 27 of the inserts 19, 25 seated in the openings on the face are not polygonal profiles. The insert 19 has a cross slot profile. The insert 25 has a flat profile. The shaft 1 has a through-bore that forms the chamber 6 and is open from the end face 3 to the opposite end face 13, wherein said through-bore has in its center a region of enlarged cross section, and wherein the spring element 10, which acts upon both inserts 19, 25 with a spring force in opposite directions, extends in said region of enlarged cross section.

In the exemplary embodiments illustrated in FIGS. 15-19, the sections of the chamber 6, in which the inserts 19, 25 are accommodated in a displaceable manner, also have a polygonal profile, particularly a hexagonal profile. The sections of the inserts 19, 25, which are accommodated therein in a displaceable manner, have a corresponding hexagonal profile. The two inserts 19, 25 can be completely pushed into the chamber 6 as described above until the end face 20 lies flush in the end face 3 and the end face 26 lies flush in the end face 13.

Figure 20:
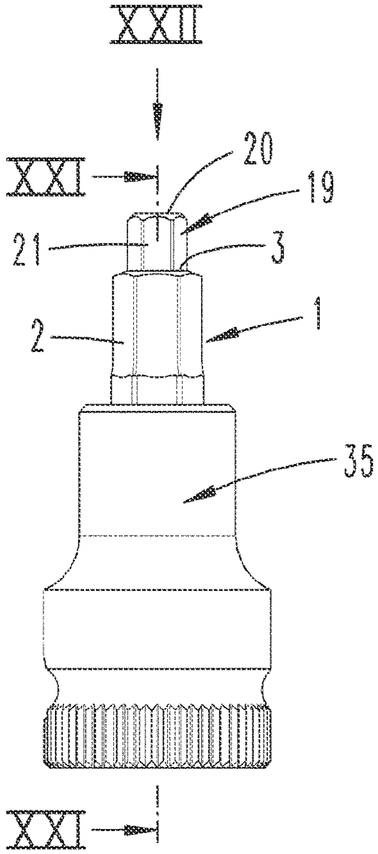
FIG. 20 shows a view of a seventh exemplary embodiment.
Figure 21:
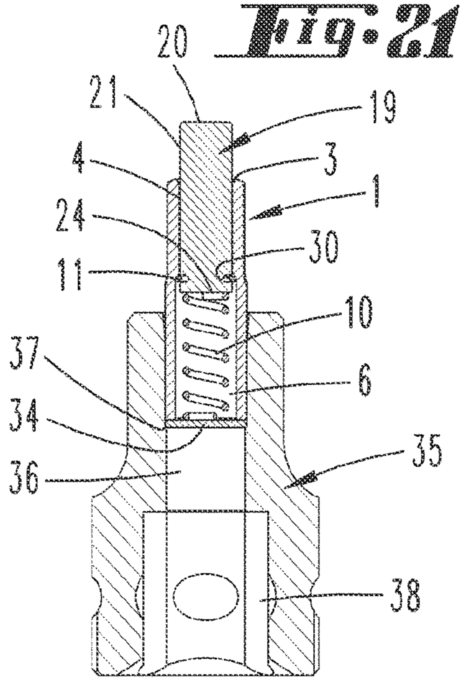
FIG. 21 shows the section along the line XXI-XXI in FIG. 20.
Figure 22:
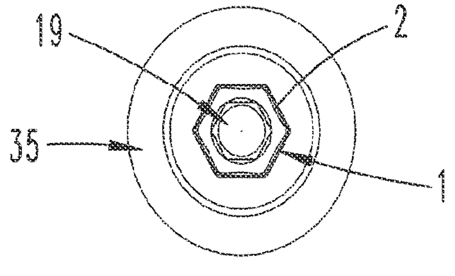
FIG. 22 shows a top view of the seventh exemplary embodiment.

The seventh, eighth and ninth exemplary embodiments illustrated in FIGS. 20-28 respectively have a shaft 1 with a cavity that forms the chamber 6, wherein said cavity is formed by a blind bore arranged in the end face 3 of the shaft 1. The blind bore has a base, which in the seventh exemplary embodiment illustrated in FIGS. 20-22 is formed by a closing plate 43. The spring element 10 is supported on the base of the blind bore with a first end. The second end of the spring element 10 acts upon the end face 24 of the single insert 19 seated in the blind bore. The insert 19 has an end face 20 that can be moved as far as a flush position with the end face 3 of the shaft 1 due to a displacement of the insert 19 against the restoring force of the spring element 10. The insert 19 forms the second output profile 21, which has a smaller cross-sectional area than the first output profile 2 formed by the free end of the shaft 1.

The seventh exemplary embodiment described with reference to FIGS. 20-22 concerns a socket, which forms a base body that serves as a holder 35 for the shaft 1. The holder 35 forms an axial cavity 36, in which the shaft 1 is seated in a frictionally engaged manner. The cavity 36 may form a step 37, on which the shaft 1 can be supported. A support element 34, e.g. in the form of a closing plate, is supported on the step 37 in the exemplary embodiment. The closing plate closes the opening of the chamber 6 on the rear side. A profiled opening 38, into which an output profile can be inserted, is provided on the side that points away from the insert 19. The profiled opening 38 may have a polygonal cross section, e.g. a square cross section or a hexagonal cross section. The profiled opening 38 may be connected to the cavity 36, into which the shaft 1 is inserted and which is closed by the shaft 1.

Figure 23:
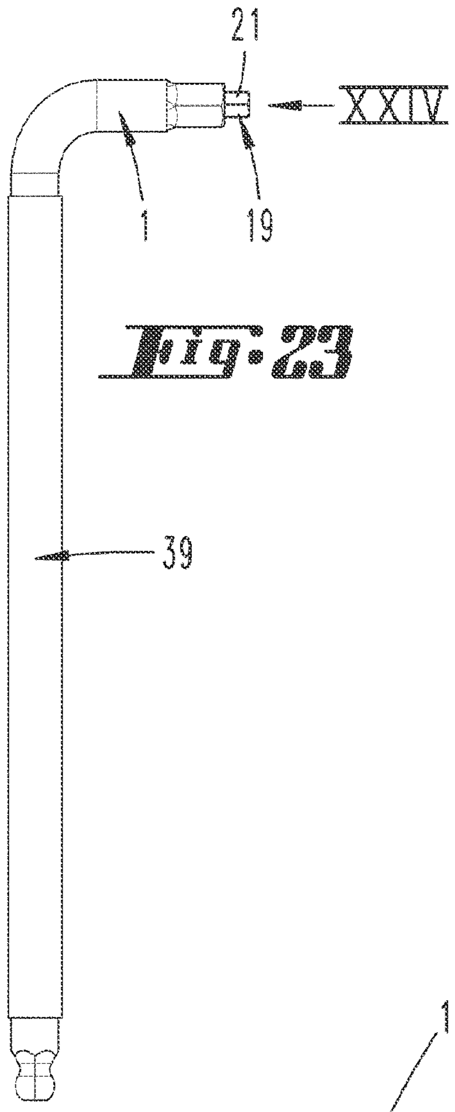
FIG. 23 shows a view of an eighth exemplary embodiment.
Figure 24:
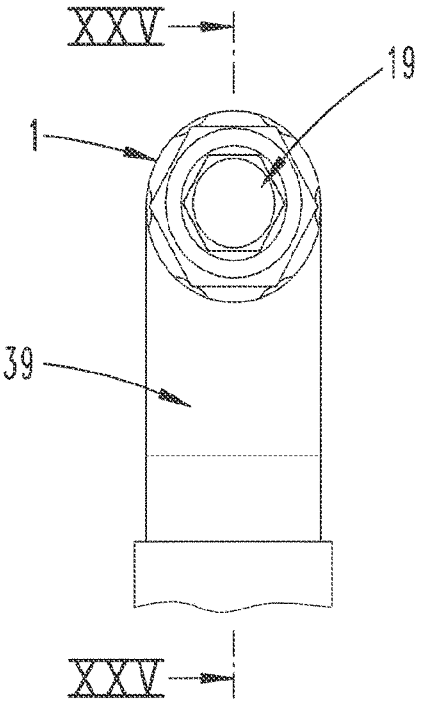
FIG. 24 shows a top view of the end face of the short offset limb of the exemplary embodiment illustrated in FIG. 23.
Figure 25:
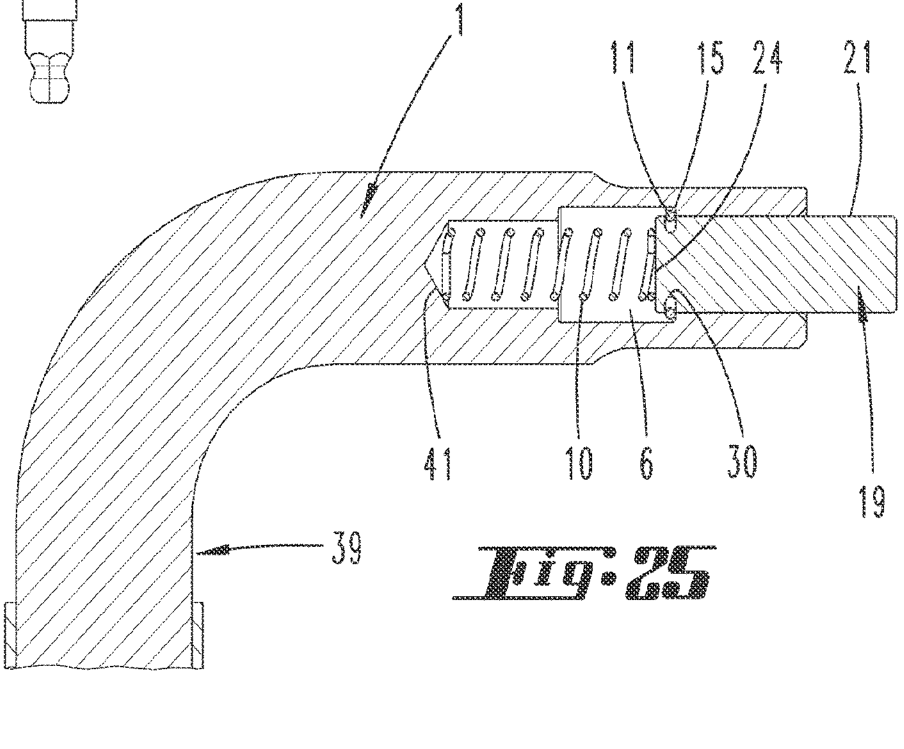
FIG. 25 shows the section along the line XXV-XXV in FIG. 24.

The eighth exemplary embodiment illustrated in FIGS. 23-25 concerns an offset screwdriver that has an output profile on the end of its long limb. The short limb of the offset screwdriver forms a shaft 1 of the above-described type. The shaft 1 has a first output profile 2 on its free end. The shaft 1 forms a blind bore, which is open toward its end face and in which an insert 19 with a second output profile 21 is seated in the above-described manner. The blind bore forms a base that serves as a supporting surface 41, on which the spring element 10 acting upon an end face 24 of the insert 19 is supported.

Figure 26:
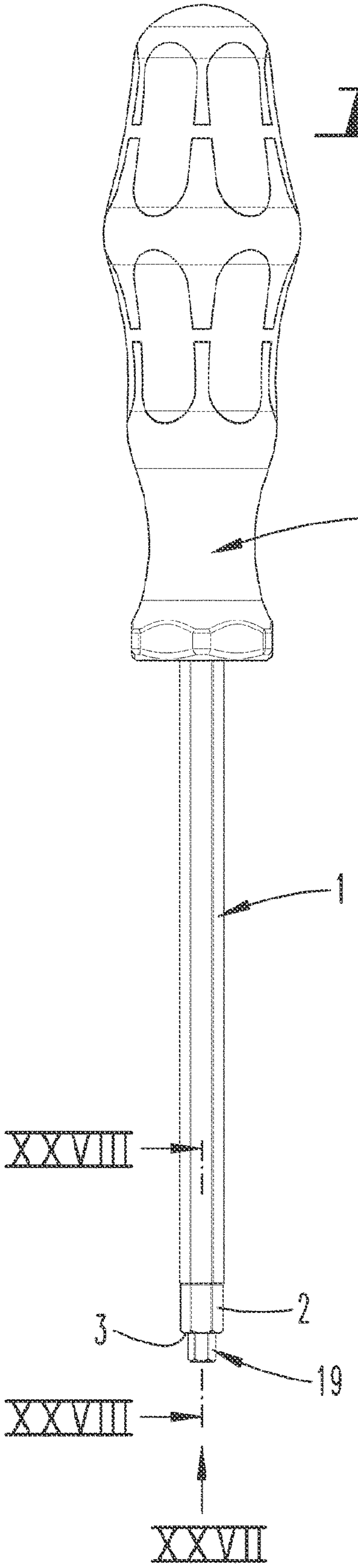
FIG. 26 shows a view of a ninth exemplary embodiment.
Figure 27:
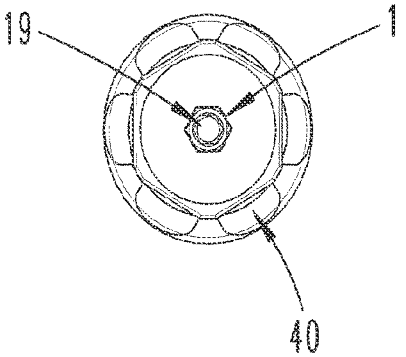
FIG. 27 shows a top view of the free end of the shaft 1 of the ninth exemplary embodiment.
Figure 28:
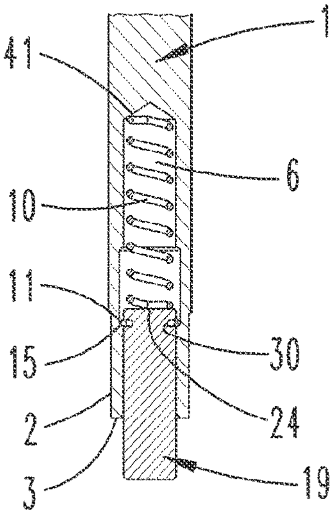
FIG. 28 shows the section along the line XXVIII-XXVIII in FIG. 27.

The ninth exemplary embodiment described with reference to FIGS. 26-28 concerns a screwing tool with a handle 40. The handle 40 may consist of plastic or wood and capture a blade that forms a shaft 1, wherein said shaft forms a first output profile 2 on its free end. A blind bore is produced in an end face 3 of the shaft 1 and forms the chamber 6, in which an insert 19 acted upon by a spring element 10 is located in the above-described manner.

The free end of the insert 19 has a hexagonal profile in the exemplary embodiment. However, it may also have any other screw output profile. The spring element 10 is supported on the base of the blind bore forming the chamber 6 on one side and on an end face 24 of the insert 19 on the other side.

With respect to the capture and function of the insert 19 in the exemplary embodiments illustrated in FIGS. 15-28, we refer to the descriptions of FIGS. 1-14.

The preceding explanations serve for elucidating all inventions that are included in this application and respectively enhance the prior art independently with at least the following combinations of characteristics, wherein two, multiple or all of these combinations of characteristics may also be combined with one another, namely:

A screwing tool, which is characterized in that the first cavity 4 and the second cavity 14 respectively transform into the chamber 7, 8, which has a greater internal cross-sectional area than the adjoining cavity 4, 14, such that a first and a second step 15, 15' are formed, wherein the first step 15 forms the counter stop, on which the stop of the first insert 19 is supported, and the second step 15' forms the counter stop of the second insert 25, on which the stop 11 of the second insert 25, which can be elastically deformed radially inward, is supported.

A screwing tool, which is characterized in that the stop 11, which can be elastically deformed radially inward, has a ring shape and lies in a depression 30 of the second insert 25.

A screwing tool, which is characterized in that the stop 11 is a clamping ring with an open gap and the depression 30 is a circumferential groove in the second insert 25.

A screwing tool, which is characterized in that the chamber 7, 8 forms a first chamber section 7 adjoining the first step 15 and a second chamber section 8 adjoining the second step 15', wherein the internal cross-sectional area of said second chamber section is greater than the internal cross-sectional area of the first chamber section 7.

A screwing tool, which is characterized in that the stop of the first insert 19 is formed by a head 22, the cross section of which is larger than the internal cross section of the cavity 4 and which forms radially protruding stop surfaces 23 supported on the first step 15, and/or in that the first cavity 4 has a polygonal cross section and the head 22 is supported on the step 15 on each polygon side.

A screwing tool, which is characterized in that the spring element 10 is supported on an end face 24, 29 of one of the two inserts 19, 25 with each of its two ends.

A screwing tool, which is characterized in that the head 22 has such a cross-sectional area that the first insert 19 including the head 22 can be axially inserted into the chamber 6, 7 through the second cavity 14.

A screwing tool, which is characterized in that the output profile of the shaft 1, which is spatially assigned to the first cavity 4, forms a first output profile, the output profile of the first insert 19 forms a second output profile, the output profile of the shaft 1, which is spatially assigned to the second cavity 14, forms a third output profile and the output profile of the second insert 25 forms a fourth output profile.

A screwing tool, which is characterized in that the output profiles 2, 12, 21, 27 are polygonal profiles with different edge lengths and/or in that the output profiles 2, 12, 21, 27 have similar circumferential wave profiles and/or in that the cross sections of the second output profile 21 or the fourth output profile 27 formed by the insert 19, 25 are dissimilar to the cross section of the first output profile (2 or the third output profile 12 assigned to the insert 19, 25 and/or in that the second output profile 21 or the fourth output profile 27 has a cross slot profile or a slot profile.

A screwing tool, which is characterized in that the second output profile 21 and/or the fourth output profile 27 can be completely displaced into the cavity 4 in such a way that the end face 20, 24 of the insert 19, 25 and the end face 3, 13 of the shaft 1 lie flush in a common plane and/or in that the second output profile 21 and the fourth output profile 27 can be completely displaced into the cavity 4 simultaneously.

A screwing tool, which is characterized in that the shaft 1 is formed by a screwdriver insert that can be inserted into a polygonal chuck.

A screwing tool, which is characterized in that the insert 19 lies in a chamber 6 in the form of a blind bore or in a chamber 6 that is closed by a support element 34, wherein the spring element 10 is supported on the base 41 of the chamber 6 or on the support element 34.

A screwing tool, which is characterized in that the shaft 1 carries a handle 40, is assigned to a holder 35 with a profiled opening 38 or formed by an offset screwdriver 39.

A screwing tool, which is characterized in that the shaft 1 is seated in a cavity 36 of a holder 35 that has a profiled opening 38 for inserting an output profile on its side that is directed away from the insert 19.

All disclosed characteristics are essential to the invention (individually, but also in combination with one another). The disclosure of the associated/attached priority documents (copy of the priority application) is hereby fully incorporated into the disclosure content of this application, namely also for the purpose of integrating characteristics of these documents into claims of the present application. The characteristics of the dependent claims also characterize independent inventive enhancements of the prior art without the characteristics of a claim to which they refer, particularly for submitting divisional applications on the basis of these claims. The invention specified in each claim may additionally comprise one or more of the characteristics that were disclosed in the preceding description and, in particular, are identified by reference symbols and/or included in the list of reference symbols. The invention also concerns design variations, in which individual characteristics cited in the preceding description are not realized, particularly as far as they are obviously dispensable for the respective intended use or can be replaced with other, identically acting technical means.

LIST OF REFERENCE SYMBOLS

1 Shaft
2 First output profile
3 End face
4 Cavity
5 Step
6 Chamber
7 Chamber section
8 Chamber section
9 Step
10 Pressure spring
11 Clamping ring
12 Third output profile
13 End face
14 Cavity
15 Step
15' Step
16 Corner recess
17 Step
18 Step
19 Insert
20 End face
21 Second output profile
22 Head
23 Stop surface
24 End face
25 Insert
26 End face
27 Fourth output profile

28 Shaft
29 End face
30 Circumferential groove
31 Screw
32 Screwing tool insertion opening
33 Base
34 Support element
35 Holder
36 Cavity
37 Step
38 Profiled opening
39 Offset screwdriver
40 Handle
41 Supporting handle
43 Closing plate
A Axis

The invention claimed is:

1. A screwing tool comprising:
an elongate shaft (1),
an output profile (2, 12) for insertion into a screwing tool insertion opening (23) of a screw (31),
a first insert (19) and a second insert (25), wherein said inserts (19, 25) are respectively arranged in a first cavity (4) and a second cavity (14), each of the first and second cavities opening toward an end face (3) of the output profiles (2, 12),
wherein each of the first and second inserts in a rotationally fixed and axially displaceable manner, respectively form an output profile (21, 27) with their ends protruding out of the cavities (4, 14), and are respectively supported with a stop on a counter stop of the shaft (1) in a position, in which the first and second inserts protrude out of the cavities, and can be displaced into the respective cavity (4, 14) against the restoring force of a spring element (10), which is arranged in a chamber (7, 8) extending between the first cavity (4) in the second cavity (14), by exerting an axial force, wherein the first cavity (4) and the second cavity (14) respectively transform into the chamber (7, 8), which has a greater internal cross-sectional area than the adjoining cavity (4, 14), such that a first step (15) and a second step (15') are formed, wherein the first step (15) forms the counter stop, on which the stop of the first insert (19) is supported, and the second step (15') forms the counter stop of the second insert (25), on which the stop (11) of the second insert (25), which is configured to be elastically deformed radially inward, is supported.

2. The screwing tool according to claim 1, wherein the stop (11) of the second insert (25), which is configured to be elastically deformed radially inward, has a ring shape and lies in a depression (30) of the second insert (25).

3. The screwing tool according to claim 2, wherein the stop (11) of the second insert (25) is a clamping ring with an open gap and the depression (30) is a circumferential groove in the second insert (25).

4. The screwing tool according to claim 1, wherein the chamber (7, 8) forms a first chamber section (7) adjoining the first step (15) and a second chamber section (8) adjoining the second step (15'), wherein an internal cross-sectional area of said second chamber section is greater than an internal cross-sectional area of the first chamber section (7).

5. The screwing tool according to claim 1, wherein the stop of the first insert (19) is formed by a head (22), a cross section of which is larger than an internal cross section of the cavity (4) and which forms radially protruding stop surfaces (23) supported on the first step (15), and/or wherein the first cavity (4) has a polygonal cross section and the head (22) is supported on the step (15) on each polygon side.

6. The screwing tool according to claim 5, wherein the head (22) has such a cross-sectional area that the first insert (19) including the head (22) can be axially inserted into the chamber (6, 7) through the second cavity (14).

7. The screwing tool according to claim 1, wherein the spring element (10) is supported on an end face (24, 29) of one of the two inserts (19, 25) with each of its two ends.

8. The screwing tool according to claim 1, wherein the output profile of the shaft (1), which is spatially assigned to the first cavity (4), forms a first output profile, the output profile of the first insert (19) forms a second output profile, the output profile of the shaft (1), which is spatially assigned to the second cavity (14), forms a third output profile and the output profile of the second insert (25) forms a fourth output profile.

9. The screwing tool according to claim 8, wherein the output profiles (2, 12, 21, 27) are polygonal profiles with different edge lengths and/or wherein the output profiles (2, 12, 21, 27) have similar circumferential wave profiles and/or wherein the cross sections of the second output profile (21) or the fourth output profile (27) formed by the insert (19, 25) are dissimilar to the cross section of the first output profile (2) or the third output profile (12) assigned to the first or second insert (19, 25) and/or wherein the second output profile (21) or the fourth output profile (27) has a cross slot profile or a slot profile.

10. The screwing tool according to claim 8, wherein the second output profile (21) and/or the fourth output profile (27) is configured to be completely displaced into the cavity (4) in such a way that an end face (20, 24) of the insert (19, 25) and an end face (3, 13) of the shaft (1) lie flush in a common plane and/or wherein the second output profile (21) and the fourth output profile (27) are configured to be completely displaced into the cavity (4) simultaneously.

11. The screwing tool according to claim 1, wherein the shaft (1) is formed by a screwdriver insert that is configured to be inserted into a polygonal chuck.

12. The screwing tool according to claim 1, wherein the first insert (19) lies in a chamber (6) in the form of a blind bore or in a chamber (6) that is closed by a support element (34), wherein the spring element (10) is supported on a base (41) of the chamber (6) or on the support element (34).

* * * * *